(12) United States Patent
Curry et al.

(10) Patent No.: US 9,565,262 B2
(45) Date of Patent: Feb. 7, 2017

(54) METHOD AND SYSTEM FOR PROVIDING LIVE REAL-TIME COMMUNICATION VIA TEXT BETWEEN MOBILE USER DEVICES

(71) Applicant: sComm, Inc., Raytown, MO (US)

(72) Inventors: Jason R. Curry, Kansas City, MO (US); David C. Lane, Franklin, TN (US); David J. McAllister, Spring Hill, TN (US)

(73) Assignee: sCOMM, Inc., Raytown, MO (US)

( * ) Notice: Subject to any disclaimer, the term of this patent is extended or adjusted under 35 U.S.C. 154(b) by 0 days.

(21) Appl. No.: 13/632,312

(22) Filed: Oct. 1, 2012

(65) Prior Publication Data
US 2013/0268605 A1   Oct. 10, 2013

Related U.S. Application Data

(63) Continuation of application No. 12/732,144, filed on Mar. 25, 2010, now Pat. No. 8,280,954.

(51) Int. Cl.
*G06F 15/16*     (2006.01)
*H04L 29/08*    (2006.01)
*H04L 12/58*    (2006.01)

(52) U.S. Cl.
CPC .......... *H04L 67/26* (2013.01); *H04L 12/5895* (2013.01); *H04L 51/38* (2013.01); *H04L 67/141* (2013.01); *H04L 12/581* (2013.01); *H04L 51/04* (2013.01)

(58) Field of Classification Search
CPC ........ H04L 12/581; H04L 51/04; H04L 51/38; H04L 67/26
See application file for complete search history.

(56) References Cited

U.S. PATENT DOCUMENTS 4,531,184 A   7/1985  Wigan et al.
4,599,612 A   7/1986  Kaji et al.
(Continued)

FOREIGN PATENT DOCUMENTS

GB           2311888           10/1997
WO     WO 01/67302 A2      9/2001
(Continued)

OTHER PUBLICATIONS

U.S. Appl. No. 09/859,059, Notice of Allowance, dated Aug. 19, 2005.
(Continued)

*Primary Examiner* — Mohamed Wasel
(74) *Attorney, Agent, or Firm* — Nixon Peabody LLP; Jeffrey L. Costellia

(57) ABSTRACT

A method and system for providing real-time communication via text between multiple user devices, the method including receiving, at an application server, a conversation request from a first user device, wherein the conversation request is based upon a selection of a second user device from a contact list that is stored on the first user device, sending the conversation request from the application server to a push server, receiving, at the application server, a conversation session ID from the second user device, if the conversation request is accepted by the second user device, sending the conversation session ID from the application server to the push server, receiving, at the application server, a first datagram message from the first user device, sending the first datagram message from the application server to the second user device, receiving, at the application server, a second datagram message from the second user device, and sending the second datagram message from the application server to the first user device.

12 Claims, 10 Drawing Sheets

(56) References Cited

U.S. PATENT DOCUMENTS

| | | | |
|---|---|---|---|
| 4,805,132 A | | 2/1989 | Okamoto et al. |
| 4,984,177 A | | 1/1991 | Rondel et al. |
| 5,119,319 A | | 6/1992 | Tanenbaum |
| 5,169,342 A | | 12/1992 | Steele et al. |
| 5,175,684 A | | 12/1992 | Chong |
| 5,268,839 A | | 12/1993 | Kaji |
| 5,338,976 A | | 8/1994 | Anwyl et al. |
| 5,351,189 A | | 9/1994 | Doi et al. |
| 5,608,622 A | | 3/1997 | Church |
| 5,612,872 A | | 3/1997 | Fujita |
| 5,615,301 A | | 3/1997 | Rivers |
| 5,712,901 A | | 1/1998 | Meermans |
| 5,715,466 A | | 2/1998 | Flanagan et al. |
| 5,724,526 A | | 3/1998 | Kunita |
| 5,781,902 A | | 7/1998 | Waszkiewicz |
| 5,805,167 A | | 9/1998 | van Cruyningen |
| 5,852,800 A | | 12/1998 | Modeste et al. |
| 5,854,997 A | | 12/1998 | Sukeda et al. |
| 5,875,422 A | | 2/1999 | Eslambolchi et al. |
| 5,905,476 A | | 5/1999 | McLaughlin et al. |
| 5,917,484 A | | 6/1999 | Mullaney |
| 5,943,398 A | | 8/1999 | Klein et al. |
| 5,974,372 A | | 10/1999 | Barnes et al. |
| 5,987,401 A | | 11/1999 | Trudeau |
| 6,061,646 A | | 5/2000 | Martino et al. |
| 6,073,146 A | | 6/2000 | Chen |
| 6,119,078 A | | 9/2000 | Kobayakawa et al. |
| 6,122,606 A | | 9/2000 | Johnson |
| 6,161,082 A | | 12/2000 | Goldberg et al. |
| 6,167,366 A | | 12/2000 | Johnson |
| 6,173,250 B1 | | 1/2001 | Jong |
| 6,205,418 B1 | | 3/2001 | Li et al. |
| 6,208,956 B1 | | 3/2001 | Motoyama |
| 6,240,392 B1 | | 5/2001 | Butnaru et al. |
| 6,307,549 B1 | | 10/2001 | King et al. |
| 6,618,704 B2 | | 9/2003 | Kanevsky et al. |
| 6,670,950 B1 | | 12/2003 | Chin et al. |
| 6,728,342 B2* | | 4/2004 | Lund .................... 379/52 |
| 6,791,583 B2* | | 9/2004 | Tang .................... G06Q 10/10 715/751 |
| 6,804,534 B2 | | 10/2004 | Lai et al. |
| 6,980,953 B1 | | 12/2005 | Kanevsky et al. |
| 6,993,474 B2 | | 1/2006 | Curry et al. |
| 7,023,969 B2 | | 4/2006 | Pines et al. |
| 7,039,393 B1 | | 5/2006 | Kite |
| 7,072,941 B2 | | 7/2006 | Griffin et al. |
| 7,085,576 B2* | | 8/2006 | Ranganathan ............ 455/456.1 |
| 7,142,642 B2 | | 11/2006 | McClelland et al. |
| 7,277,858 B1 | | 10/2007 | Weaver et al. |
| 7,315,612 B2 | | 1/2008 | McClelland |
| 7,346,157 B2 | | 3/2008 | Pines et al. |
| 7,430,283 B2 | | 9/2008 | Steel, Jr. |
| 7,519,652 B2 | | 4/2009 | Page et al. |
| 7,555,521 B1 | | 6/2009 | McLaughlin et al. |
| 7,573,985 B2 | | 8/2009 | McClelland et al. |
| 7,640,293 B2 | | 12/2009 | Wilson et al. |
| 8,275,602 B2 | | 9/2012 | Curry et al. |
| 8,280,954 B2* | | 10/2012 | Curry .................... H04L 12/5895 379/52 |
| 8,433,761 B2 | | 4/2013 | Williams |
| 2001/0041981 A1* | | 11/2001 | Ekudden et al. .......... 704/270.1 |
| 2002/0173965 A1 | | 11/2002 | Curry et al. |
| 2004/0073432 A1 | | 4/2004 | Stone |
| 2005/0149318 A1 | | 7/2005 | Honda et al. |
| 2005/0174997 A1 | | 8/2005 | Hinde et al. |
| 2006/0025214 A1 | | 2/2006 | Smith |
| 2006/0101127 A1* | | 5/2006 | Brown .................... G09B 5/06 709/207 |
| 2006/0206309 A1 | | 9/2006 | Curry et al. |
| 2006/0288077 A1 | | 12/2006 | Chen |
| 2008/0005294 A1 | | 1/2008 | Morris |
| 2008/0109208 A1 | | 5/2008 | Curry et al. |
| 2008/0261181 A1 | | 10/2008 | Kennedy et al. |
| 2008/0293384 A1* | | 11/2008 | Jones .................... 455/412.1 |
| 2009/0047989 A1 | | 2/2009 | Harmon et al. |
| 2010/0262650 A1 | | 10/2010 | Chauhan et al. |
| 2011/0246606 A1 | | 10/2011 | Barbeau et al. |
| 2012/0317499 A1* | | 12/2012 | Shen .................... G06Q 10/107 715/752 |
| 2013/0268605 A1 | | 10/2013 | Curry et al. |
| 2015/0312182 A1* | | 10/2015 | Langholz ................ H04L 51/04 715/753 |

FOREIGN PATENT DOCUMENTS

| | | |
|---|---|---|
| WO | WO 02-100066 A1 | 12/2002 |
| WO | WO 2007/124109 A2 | 11/2007 |
| WO | WO 2007/124109 A3 | 11/2007 |
| WO | WO 2008-092148 A1 | 7/2008 |

OTHER PUBLICATIONS

U.S. Appl. No. 09/859,059, Amendment, dated Dec. 23, 2004.
U.S. Appl. No. 09/859,059, non-final Office Action, dated Jun. 23, 2004.
U.S. Appl. No. 09/859,059, Preliminary Amendment, dated Jul. 30, 2002.
U.S. Appl. No. 11/290,513, non-final Office Action, dated Nov. 17, 2006.
U.S. Appl. No. 11/290,513, Preliminary Amendment, dated May 8, 2006.
U.S. Appl. No. 11/290,513, Preliminary Amendment, dated Apr. 17, 2006.
U.S. Appl. No. 11/290,513, Specification, Claims, Abstract and Drawings, dated Dec. 1, 2005.
U.S. Appl. No. 11/290,513, Preliminary Amendment, dated Dec. 1, 2005.
Ballesteros et al., "Phrasal Translation and Query Expansion Techniques for Cross Language Information Retrieval," pp. 84-91, 1997, Ctr. for Intelligent Info Retrieval, C.S. Dept., UMASS Amherst.
Sheridan et al., "Experiments in Multilingual Info Retrieval Using the SPIDER System," pp. 58-65, 1996, Swiss Federal Institute of Technology.
U.S. Appl. No. 11/790,085, final Office Action, dated Jan. 19, 2012.
U.S. Appl. No. 11/790,085, After Final Response, dated Dec. 22, 2011.
U.S. Appl. No. 11/790,085, final Office Action, dated Jun. 22, 2011.
U.S. Appl. No. 11/790,085, Amendment, dated Apr. 14, 2011.
U.S. Appl. No. 11/790,085, non-final Office Action, dated Oct. 14, 2010.
U.S. Appl. No. 11/790,085, Replacement Drawings, dated Dec. 17, 2007.
International Application No. PCT/US2007/009755, Specification, Claims, Abstract and Drawings, dated Apr. 23, 2007.
International Application No. PCT/US2007/009755, Replacement Drawings, dated Aug. 13, 2007.
"AnnieS: Home", http://annies.nl, accessed on Dec. 2, 2009.
"Welcome to 4C telecom", http://www.4ctelecom.net/annies.html, accessed on Nov. 5, 2009.
"NXi Communications", http://www.nxicom.com/text_communications.html. accessed on Dec. 2, 2009.
Kruyer, R., "How Real Time Text contributes to a global community of communication", IFHOH Journal, Dec. 2008, pp. 5-6.
Schulzrinne, H., et al., "The Session Initiation Protocol: Internet-Centric Signaling", IEEE Communications Magazine, Oct. 2000, pp. 134-141.
"$3^{rd}$ Generation Partnership Project; Technical Specification Group Services and System Aspects; End-to-End QoS Concept and Architecture", 3G TS 23.207 V1.4.2 (May 2001).
Yeh, S., et al., "Designing an Integrated Voice, Video, and Instant Message Service System in Sip-Based IP Networks", IEEE, 2006.
International Search Report and Written Opinion, mailed on Sep. 7, 2011, in International Application No. PCT/US2011/029801.
Communication pursuant to Article 94(3) EPC, European Patent Office, Application No. 11 723 143.1, dated Jul. 12, 2013 (7 pages).

\* cited by examiner

Structure of a GSM network (key elements)

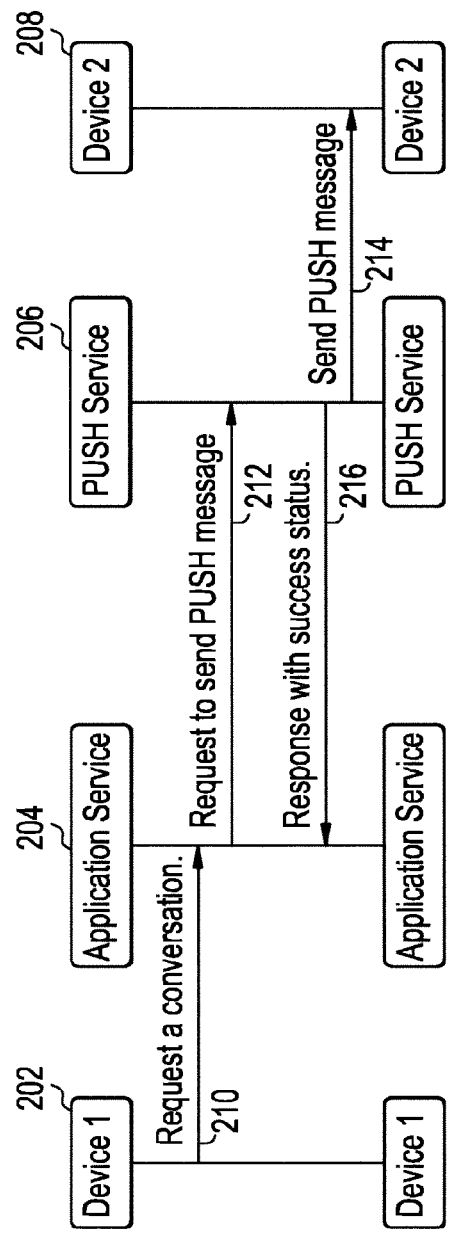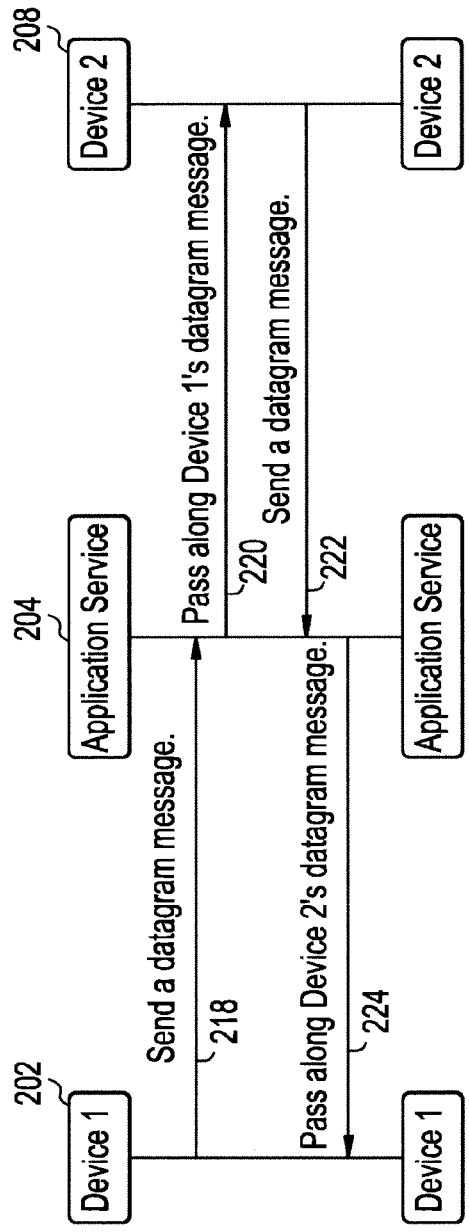

FIG. 7

Receiving, at an Application Server, a Conversation Request from a First User Device, wherein the Conversation Request is Based Upon a Selection of a Second User Device from a Contact List that is Stored on the First User Device
702

↓

Sending the Conversation Request from the Application Server to a Push Server
704

↓

Receiving, at the Application Server, a Conversation Session ID from the Second User Device, if the Conversation Request is Accepted by the Second User Device
706

↓

Sending the Conversation Session ID from the Application Server to the Push Server
708

↓

Receiving, at the Application Server, a First Datagram Message from the First User Device
710

↓

Sending the First Datagram Message from the Application Server to the Second User Device
712

↓

Receiving, at the Application Server, a Second Datagram Message from the Second User Device
714

↓

Sending the Second Datagram Message from the Application Server to the First User Device
716

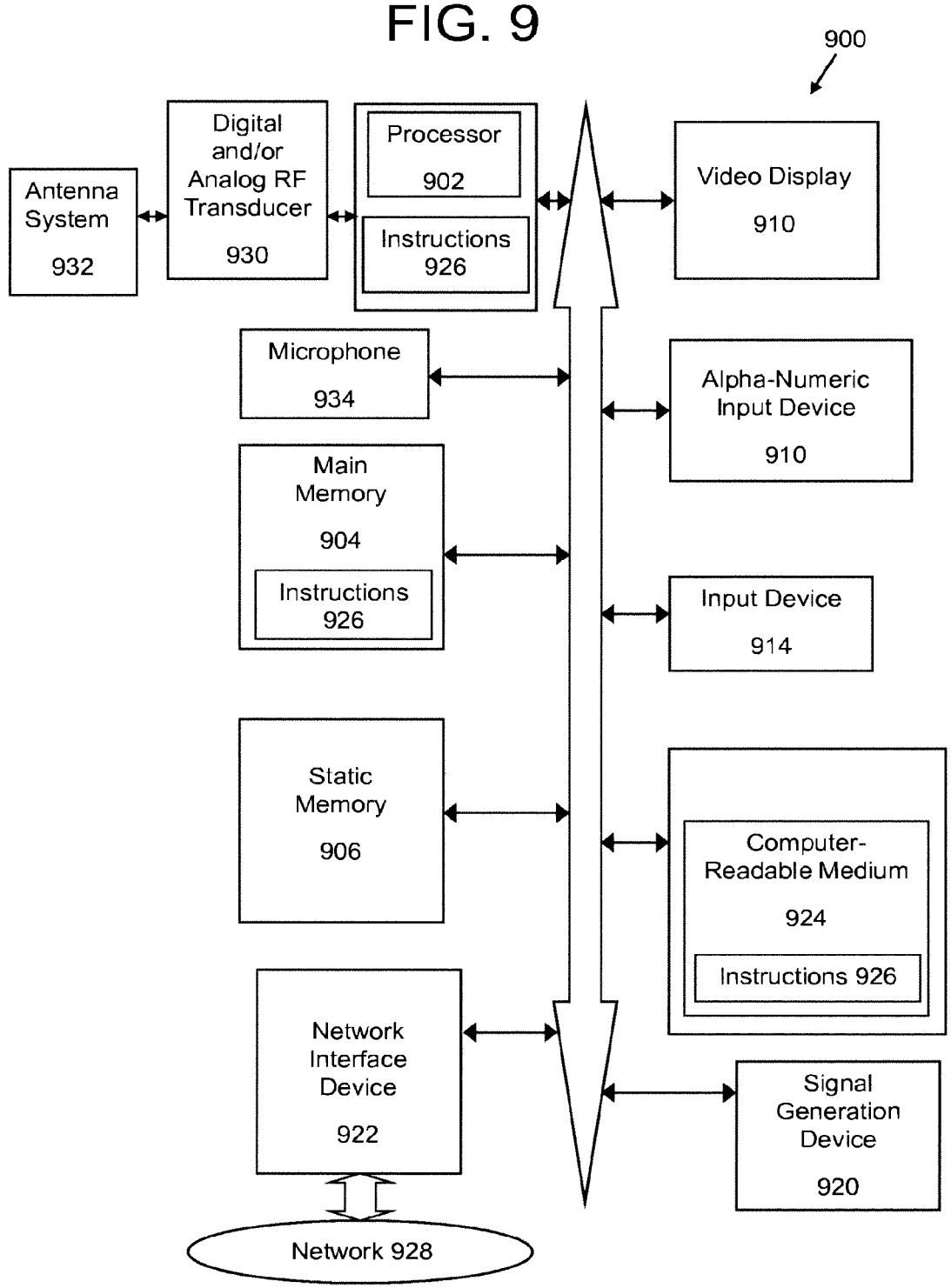

METHOD AND SYSTEM FOR PROVIDING LIVE REAL-TIME COMMUNICATION VIA TEXT BETWEEN MOBILE USER DEVICES

FIELD OF THE INVENTION

This invention relates generally to live real-time text communication system. In particular, one embodiment of this invention relates to a method and system for allowing live real-time character-by-character text-based communication between mobile user devices, such as cellular phones or other personal communication devices.

BACKGROUND OF THE INVENTION

Over 28 million people in the United States experience some degree of hearing loss. Approximately four million of those are profoundly deaf Many of these deaf or hard of hearing individuals are confronted with barriers that impede their ability to effectively communicate with others. Such barriers include the inability to use spoken language, the inability of others to use and understand sign language, and the inability to understand the language being spoken to them.

Conversations with the deaf or hard of hearing are becoming increasingly limited due to the lack of communication skills of most individuals. Those individuals who do not have a broad range of communication skills are faced with a limited amount of resources available in order to effectively communicate with the deaf or hard of hearing. For example, the use of lip-reading, hand written notes, the use of gestures and other communication tools are commonly used. Lip reading is also commonly used. However, all of these techniques are limiting for the deaf or hard of hearing because intricate, involved conversations are not possible without the aid of a human interpreter, or the time-consuming and frustrating necessity of passing notes back and forth or other communication tools. Further, the use of a human interpreter is often difficult to arrange as well as expensive and lack of communication limits deaf or hard of hearing people in being able to be mobile in professional or social settings.

In addition, the use of mobile communication has grown dramatically in recent years. For deaf or hard of hearing individuals, verbal use of a mobile phone or communication device can be difficult, if not, impossible. Although emailing and text messaging are available, such formats are less desirable as a primary source of communication, since it does not match typical conversational exchange in a real time manner, since each party is required to wait the others response before continuing. Such a format can also be less desirable for hearing users when using text for communication purposes.

BRIEF DESCRIPTION OF THE DRAWINGS

Various embodiments of this invention will be described in detail, with reference to the following figures, where:

FIGS. 2A-2B are schematic representations of how datagrams and requests are sent between user devices according to one embodiment of the present invention.

FIG. 7 is a flowchart illustrating an embodiment of a method for a live real-time text communication between users according to the present invention;

FIG. 9 is a diagrammatic representation of a mobile user device in accordance with the present invention.

DETAILED DESCRIPTION OF THE INVENTION

Figure 1:
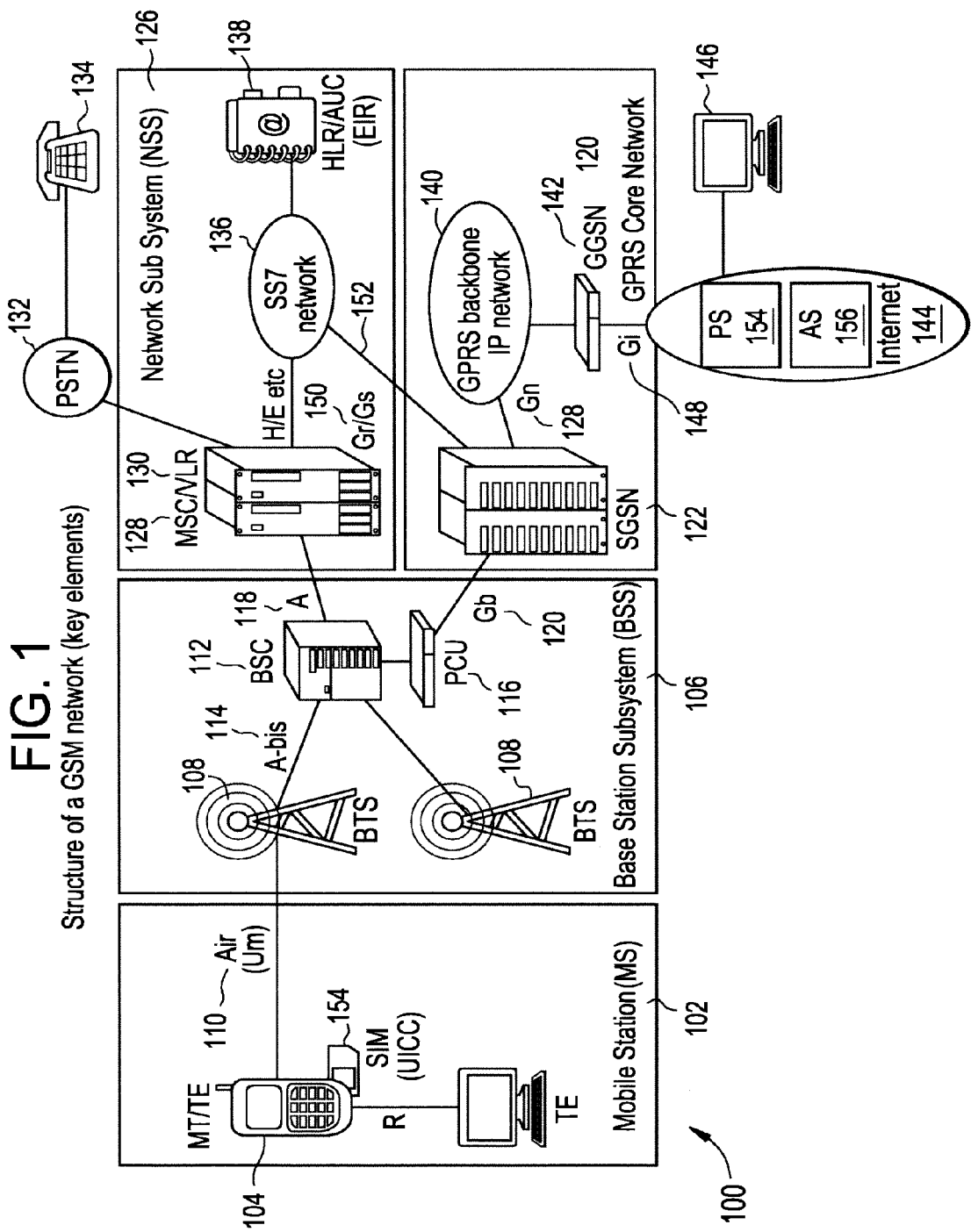
FIG. 1 illustrates a global system for mobile communication (GSM) of the present invention.

For a general understanding of the features of the present invention, reference is made to the drawings, wherein like reference numerals have been used throughout to identify identical or similar elements. While the present invention is described in terms of an illustrative embodiment or embodiments, it will be understood that the invention is adaptable to a variety of translation applications, such that the present invention is not necessarily limited to the particular embodiment or embodiments shown and described herein. To the contrary, the following description is intended to cover all alternatives, modifications, and equivalents, as may be included within the spirit and scope of the invention. Specifically, it will be understood that the instant invention applies to all various types of text messaging applications, and it is not intended to be limited by the manner in which the conversations are relayed and/or translated.

As for the principles, the specific operation of the live real-time text-based communication system relates to mobile user devices having application stored there that allows live real-time text-based conversations with other mobile user device having the same application. A datagram forming the live real-time text-based conversation is relayed from a first mobile user device to a second mobile user device as a key is pressed on the keypad of the first mobile user device. The result is that both users can seamlessly converse in a live real-time character-by-character text-based conversation.

A structural illustration of a live real-time text based global system for mobile communication (GSM) of an embodiment of the present invention can be seen in FIG. 1. The GSM is a cellular network that includes mobile user devices 104 that connect to the GSM via cells (not shown) in the immediate vicinity. Typically, there can be five different cell sizes in the GSM network—macro, micro, pico, femto, and umbrella cells. The coverage of each cell varies according to the implementation environment. Macro cells can be regarded as cells where the base station antenna is installed on a mast or a building above average roof top level. Micro cells are cells whose antenna height is under average roof top level; they are typically used in urban areas. Picocells are small cells whose coverage diameter is a few dozen meters; they are mainly used indoors. Femtocells are cells designed for use in residential or small business environments and connect to the service provider's network via a broadband interne connection. Umbrella cells are used to cover shadowed regions of smaller cells and fill in gaps in coverage between those cells.

The mobile user device 104 used in the present GSM network may include a cellular phone, a BlackBerry™, a personal digital assistant (PDA), and a laptop computing device, just to name a few. Typically, a subscriber identity module, commonly known as a SIM card 154, will be included in mobile device 104. The SIM card 154 is usually a detachable smart card that contains the user's subscription information and phone book. This allows the user to retain his or her information after switching mobile devices.

The mobile device 104 is connected to the GSM, typically, through an air interface 110 (also known as an Um interface) to a base station subsystem (BSS) 106. The BSS 106 is the section of the GSM network 100 that is responsible for handling traffic and signaling between the mobile user device 104 and the network switching subsystem (NSS) 126. Generally, the BSS 106 carries out transcoding of speech channels, allocation of radio channels to the mobile device 104, paging, quality management of transmission and reception over the air interface 110 and many other tasks related to the GSM network 100. The base transceiver stations (BTS) 108 of the BSS 106 contain the equipment for transmitting and receiving radio signals (transceivers), antennas, as well as equipment for encrypting and decrypting communications for the base station controller (BSC) 112. Typically, a BTS 108 for anything other than a picocell will have several transceivers which allow it to serve several different frequencies and different sectors of the cell (in the case of sectorized base stations).

A BTS 108 can be a plain transceiver which receives information from the mobile device 104 through the air interface 110, and then converts the information to a time division multiplexing (TDM) based interface, e.g., the A-bis interface 114, and sends the information to the BSC 112.

BTSs 108 are generally controlled by a parent BCS 112 via a base station control function (BCF). The BCF (not shown) is implemented as a discrete unit or even incorporated in a transceiver in compact base stations. The BCF provides an operations and maintenance connection to the network management system (not shown), and manages operational states of each BTS 108, as well as software handling.

The databases for all the sites, including information such as carrier frequencies, frequency hopping lists, power reduction levels, receiving levels for cell border calculation, are stored in the BSC 112. This data is obtained directly from radio planning engineering which involves modeling of the signal propagation as well as traffic projections.

The BSC 112 classically provides the "intelligence" behind the BTSs 108. A BSC 112 may have tens or even hundreds of BTSs 108 under its control. The BSC 112 can handle allocation of radio channels, can receive measurements from the mobile user devices 104, and can control handovers between multiple BTSs 108. A key function of the BSC 112 is to act as a concentrator where many different low capacity connections to BTSs 108 become reduced to a smaller number of connections toward the mobile switching center (not shown). The BSC 112 is often based on a distributing computing architecture, with redundancy applied to critical functional units to ensure availability in the event of fault conditions. Redundancy often extends beyond the BSC 112 itself and is commonly used in the power supplies, as well as in the transmission equipment providing a packet control unit (PCU) 116 with information from the A interface.

The PCU 116 is a component of the BSS 106 that performs some of the processing tasks of the BSC 112, but for packet data or datagrams. The allocation of channels between voice and data is controlled by the BSC 112, but once a channel is allocated to the PCU 116, the PCU 116 can take full control over that channel.

The BSC 112 connects to the network switching subsystem (NSS) 126 via the A interface 118. The NSS 126 is the component of the GSM network 100 that carries out switching functions and manages the communications between the mobile user device 104 and the public switched telephone network 132, 134. The NSS 126 is usually owned and deployed by mobile phone operators such as T-Mobile, Verizon, Sprint, AT&T, etc., and allows mobile user devices 104 to communicate with each other and telephones in the wider telecommunications network (not shown). The architecture usually resembles a telephone exchange, but there are additional functions which are needed because the mobile user devices 104 are not fixed in one location.

The BSC 112 of the base station subsystem (BSS) 106 is connected to the mobile switching center (MSC) 128 of the NSS 126 via the A interface 118. Although there are usually transcoding units between BSC and MSC, the signaling communication takes place between these two ending points and the transcoder unit doesn't touch the signaling system 7 information, only the voice or CS data are transcoded or rate adapted.

The MSC 128 is primary service delivery node for the GSM network 100, and is typically responsible for handling voice calls and short message service (SMS) texts, as well as conference calls, FAX, and circuit switched data. The MSC 128 usually sets up and releases end-to-end connection, handles mobility and hand-over requirements during a call. The fax and data information received at the MSC 128 is digitally encoded, and at the MSC 128 the fax and data information is re-coded into an "analogue" signal.

The visitor location register (VLR) 130 is a database that is usually located in the NSS 126, and stores information about all the mobile user devices 104 that are currently under the jurisdiction of the MSC 128 that is serves. The location area identity of each of the mobile user devices 104 is stored at the VLR 130. The location area identity determines under which BSC 112 a particular mobile user device 104 is currently present. This information is vital in the call setup process. Usually, the VLR 130 is directly integrated into the MSC 128.

The VLR 130 is connected to the signaling system 7 (SS7) network 136, which is a high-speed and high-performance packet-based communications protocol, and can communicate significant amounts of information when setting up a call, during the call, and at the end of the call. The SS7 network 136 permits call-related services such as call forwarding (busy and no answer), voice mail, call waiting, conference calling, calling name and number display, just to name a few. The SS7 network 136 also affords non-call-related signaling that is not directly related to the establishment of a mobile or telephone call. An example of this is the exchange of the registration information used between a mobile user device 104 and the home location register (HLR) database 138.

The HLR database 138 is a central database that contains details of each mobile device subscriber that is authorized to use the GSM network 100. The HLR database 138 stores details of every SIM card 154 used by mobile user devices 104 in the network. Each SIM card 154 includes an identifier called an IMSI, which is the primary key to each record stored in the HLR database 138. The authentication center (AUC) authenticates each SIM card 154 that attempts to connect to the GSM network 100.

The general packet radio service (GPRS) core network 120 is used by mobile user devices 104 to provide mobility management, session management, and transport for internet protocol (IP) packet services in the GSM network 100. Packets describes any message formatted as a packet, and the term datagram is generally a packet of an "unreliable" service. A "reliable" service is one that notifies the user if delivery of the message fails, while an "unreliable" service is one that does not notify the user if deliver fails. The GPRS tunneling protocol is the defining IP protocol of the GPRS core network 120. Primarily, it is the protocol that allows mobile user devices 104 to move from place to place while continuing to connect to the Internet 144 as if from one location at the Gateway GPRS Support Note (GGSN) 142. This is normally accomplished by carrying the mobile user device's 104 data from the device's current Serving GPRS Support Node (SGSN) 122 to the GGSN 142 that is handling the mobile user device's session. The GGSN 142 use a Gi interface 148, which is an IP interface, to connect with a public data network either directly to the Internet 144 or through a WAP gateway (not shown). The PUSH server (PS) 154 and the Application server (AS) 156 can both be stored remotely and accessed through the Internet 144.

The GGSN 142 is one of the main components of the GPRS network 120. The GGSN is responsible for the interworking between the GPRS network 120 and external packet switched networks, such as the Internet 144. From an external network's point of view, the GGSN 142 is a router to a sub-network, since the GGSN 142 "hides" the GPRS network 120 infrastructure from the external network. When the GGSN 142 receives data addressed to a specific mobile user device 104, it checks to see if the user device is active. If the mobile user device 104 is active, then the GGSN 142 forwards the data to the SGSN 122 that is serving that mobile user device 104. However, if the mobile user device 104 is inactive, the data can be discarded. The GGSN 142 acts as an anchor point that enables the mobility of the mobile user device 104 in the GPRS network 120. It maintains routing necessary to tunnel the protocol data units to the SGSN 122 that service a particular mobile user device 104.

The GGSN 142 converts the GPRS packets (or datagrams) coming from the SGSN 122 into the appropriate packet data protocol (PDP) format (e.g., IP or X.25) and sends them out on the corresponding packet data network. In the other direction, PDP addresses of incoming data packets (or datagrams) are converted to the GSM address of the destination mobile user device. The readdressed packets are sent to the responsible SGSN 122. For this purpose, the GGSN 142 stores the current SGSN address of the mobile user device 104 and the user's profile in its location register. The GGSN 142 is responsible for IP address assignment and is the default router for the connected user equipment. The GGSN 142 can also perform authentication and charging functions.

The SGSN 122 is responsible for the delivery of data packets (or datagrams) from and to the mobile user devices 104 within its geographical service area, and connects via a Gb interface 120 to the PCU 116 of the base station subsystem (BSS) 106. The transmission protocol of the Gb interface could be Frame Relay or IP Tasks of the SGSN 122 also include datagram (or packet) routing and transfer, mobility management (attach/detach and location management), logical link management, and authentication and charging functions. A location register of the SGSN 122 stores location information (e.g., current cell, current VLR) and user profiles (e.g., IMSI, addresses used in the datagram or packet data network) of all the GPRS users registered with this particular SGSN 122. A SGSN 122 can connect to other SGSNs in the GPRS backbone IP network 140 via a Gn interface 124, which is an IP based interface to other SGSNs and internal GGSNs 144. Although not shown in FIG. 1, it is understood that between the SGSN 122 and GGSNs external to its network, there is a border gateway, which is essentially a firewall.

The Gr interface 150 allows communication between an SGSN 122 and the HLR 138. Messages going through this interface uses an MAP3 protocol. The Gs interface 152 is the interface that allows communication between an SGSN 122 and the MSC/VLR 128,130. The Gs interface 152 allows paging and station availability when performing data transfer. When a mobile user device 104 is attached to the GPRS network, the SGSN 122 keeps track of which routing area the mobile user device 104 is attached to. A routing area is a part of a larger location area, although not shown. When the mobile user device 104 is paged this information is used to conserve network resources. When the mobile user device 104 performs a PDP context, the SGSN 122 has the exact BTS 108 the mobile user device 104 is using.

FIG. 2A depicts how a live real-time texting conversation is established between multiple user devices. This process is initiated when a user of a first user device 202 selects a contact from a contact list that is stored on the first user device 202, or when the user manually enters the contact's number. Once the contact has been selected, the first user device 202 sends a conversation request 210 to an application server 204, and the application server 204 then sends a PUSH message request 212 to the PUSH server 206. The PUSH server 206 then sends the PUSH message 214 to the intended user device, e.g., the second user device 208.

Only user devices that have registered with the application server 204 may listen for incoming PUSH messages. Registered user devices are able to listen for incoming PUSH messages 214 using an application (not shown) that is stored on the registered user device, such as a registered BlackBerry™.

The contents of a PUSH message are free-form, e.g., they may contain whatever data the application server 204 wishes to send to the application stored on the user device. The PUSH message request 212 that is sent from the application server 204 to the PUSH server 206 may include the following information:

a "deliver before" timestamp;
    the PUSH server 206 must deliver the message to its intended recipient(s) before the specified time or the message will be discarded;
recipient device PIN(s);
    the unique device PIN number(s) to receive the PUSH message;
message body;
    free-form data to be sent to the recipient device(s).

The PUSH server 206 responds to the application server's request 212 with a status code 216, indicating the current status of the PUSH message 214 being sent to the second user device 208. The status of message 216 may be, e.g., "sending", "processing", "failed", or "success". The PUSH server 206 then queues the PUSH message to be sent to the second user device 208. A PUSH message request 212 for an unregistered user device will be rejected by the PUSH server 206. The PUSH application (not shown) that is stored on user devices listens for incoming data using a message digest stream (MDS) PUSH input stream (not shown), which listens for data on a port registered for use by the application server 204. The registered port (not shown) is allocated by the PUSH server 206, with each port being used by a different application server. The application stored on the user device has a thread dedicated to listening for PUSH messages. The thread opens the MDS PUSH input stream for the port allocated for the application server 204, and listens for incoming PUSH message data 214 until the application is closed or the input stream is otherwise terminated.

Note that while the sequence illustrated in FIG. 2A only shows sending a push message 214 to one user device 208, it is understood that the application server 204 may request that the push server 206 sends a PUSH message 214 to more than one user device.

Similarly, when a call is terminated by one of the user devices, a web request is sent from the user device 202 to the application server 204, notifying the server 204 of the device's exit from the call. The application server 204 then sends a PUSH message request to the PUSH server to notify the other user device of the call-ending event.

As illustrated in FIG. 2B, once a user device has accepted the conversation request of FIG. 2A, the first user device 202 and the second user device 208 are added to a conversation session, or a "call", which allows the users to communicate with each other via real-time text messaging.

Once the application (not shown) stored on the second user device 208 accepts the conversation request, a conversation screen (not shown in FIG. 2B) is displayed on the first 202 and second user devices 208, as well as a datagram connection (not shown). The datagram connection (not shown) allows the user devices 202, 208 to send and receive messages by communicating with the application server 204 in real-time.

As the user of the first user device 202 presses each key in a text conversation, the key press is transmitted as a datagram message 218 to the application server 214. When the application server 204 receives a datagram message 218 or 222, it processes the message to determine the intended conversation session (each datagram carries a conversation session ID as part of its payload). The application server 204 access the list of known participants, which in the instant example are devices 202 and 208, for the specified conversation and sends the datagram 220 and 224 to the intended user device. The application server 204 by maintaining and honoring the network-allocated port numbers, allows communication between a multiple user devices. User devices can share IP addresses and therefore require that the application server 204 also honor port address translations. However, it is not mandatory that this functionality is required by the network.

Datagram and Push messages can have the following format:

```
SESSIONID: {conversation session ID}
#CONTROL:{control code (message type)}
#SERVER:{datagram URL}
#SENDER:{sending user's username}
{message body}
```

Datagram communication, and in general most user datagram protocol (UDP) communication, is generally unreliable, but this type of communication has a speed advantage over the more reliable transmission control protocol (TCP) communication, and thus is a desired form of communication for real-time texting. Some of the shortcomings of datagram communication include messages being sent without acknowledging receipt by the intended recipient, the messages may be received out of their intended order, messages may not be received by their intended recipient, does not throttle communication connection speeds, and sends individual data packets (individual messages) rather than a constant stream. With respect to the present invention, datagram communication can include real-time text messaging, real-time voice to text messaging, real-time text to automated voice message, as well as voice recognition.

Since datagram communication does allow message packets to be "dropped", or lost in transmission, before reaching the intended recipient due to network packet loss or other network communication issue, key presses may not be displayed on the recipient's user device. The result would be, in this example, garble or partial text sent and received during the text conversation.

The present invention is able to circumvent these pitfalls of the conventional UDP communication by including redundancy to the message data. Generally, this is accomplished during a real-time text conversation between users, by appending message data to the incoming text field on the participants, resulting in what appears to be a continuous stream of key presses. The result is the ability to send and receive real-time character-by-character text-based communication.

Figure 3:
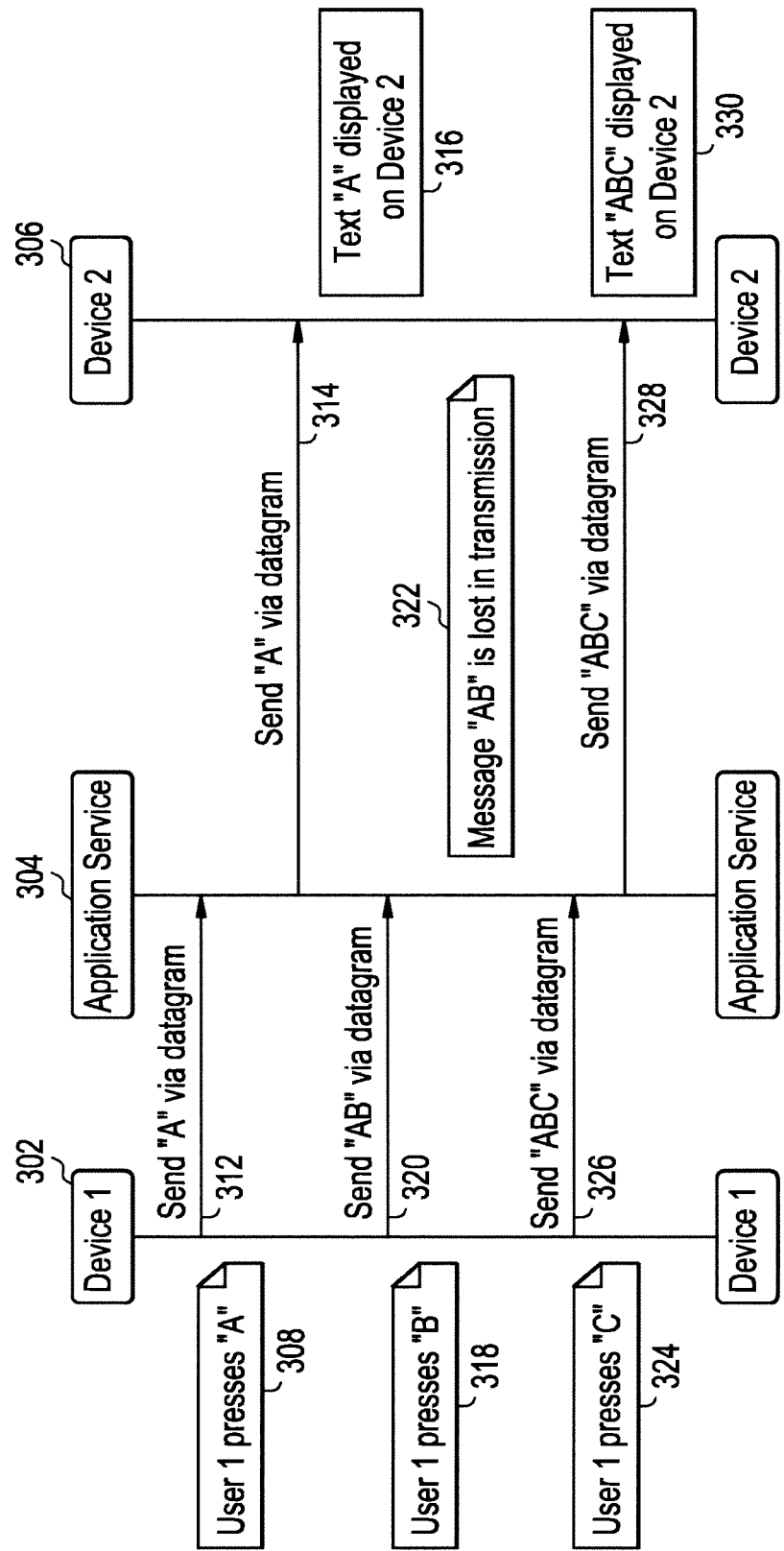
FIG. 3 illustrates how redundancy in messaging in provided in one embodiment of the present invention.

An example of this is illustrated in FIG. 3. By way of example, during a real-time text communication between user 1 and user 2, user 1 press the "A" key 308 on the first user device 302, and a datagram message containing the letter "A" 312 is sent from the first user device 302 to the application server 304. The application server 304 then sends the datagram message containing the letter "A" 314 to the second user device 306, and "A" is displayed on the second user device 316. As seen at item 318, user 1 then presses the "B" key on the first user device 302, and a datagram is sent from the first user device 302 that contains the letters "AB" to the application server 320. However, the datagram containing the text "AB" is lost in transmission between the application server 304 and the second user device 306. However, a datagram message containing the text "ABC" 326 is sent from the first user device 302 when the first user presses the "C" key on the first user device 302. The application server then sends a datagram containing the text "ABC" 328, which is then displayed 330 on the second user device 330. Consequently, even though the datagram for the key press of "B" is lost in transmission, the letter "B" will still be displayed on the second user device since the datagram message 328 for the key press "C" includes the text of the previous key press of the first user.

Thus, instead of sending only the most recent key press in a datagram message, each datagram message of the present invention contains the most recent key presses of the sending user. The result of the example illustrated in FIG. 3 is that a reliable stream of real-time character-by-character communication is displayed on the second user device 302, even if a datagram message of a key press is lost in transmission, since the next datagram message received at the second user device will include the missing information, in this example the letter "B."

Figure 4:
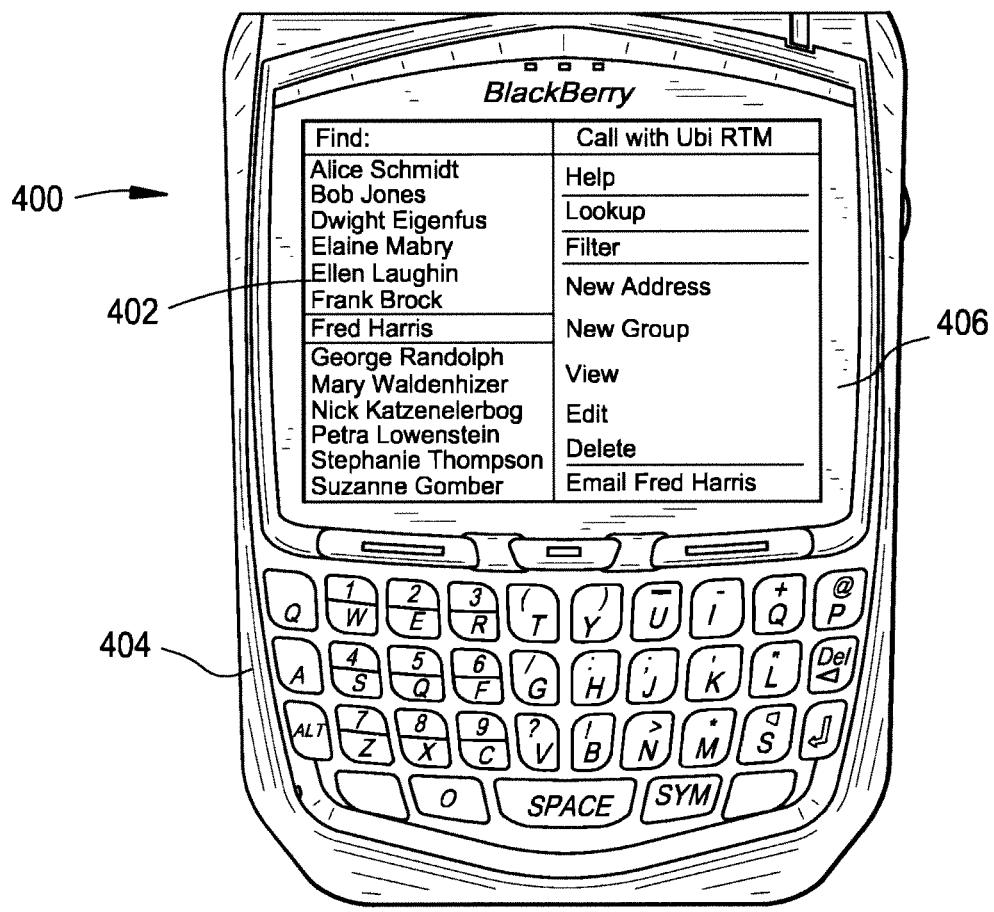
FIG. 4 illustrates a user device including a list of contacts that are registered for live real-time text communication according to an embodiment of the present invention.
Figure 5A:
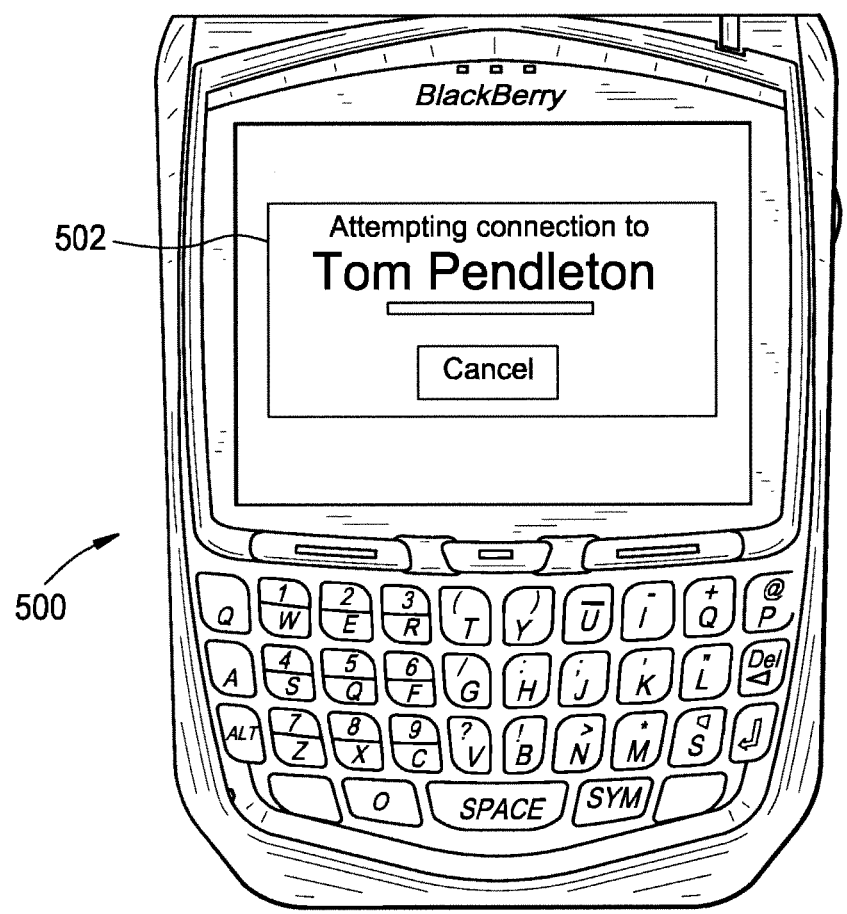
FIGS. 5A-5B illustrate what is being displayed on user devices during a pending conversation request according to the present invention.
Figure 5B:
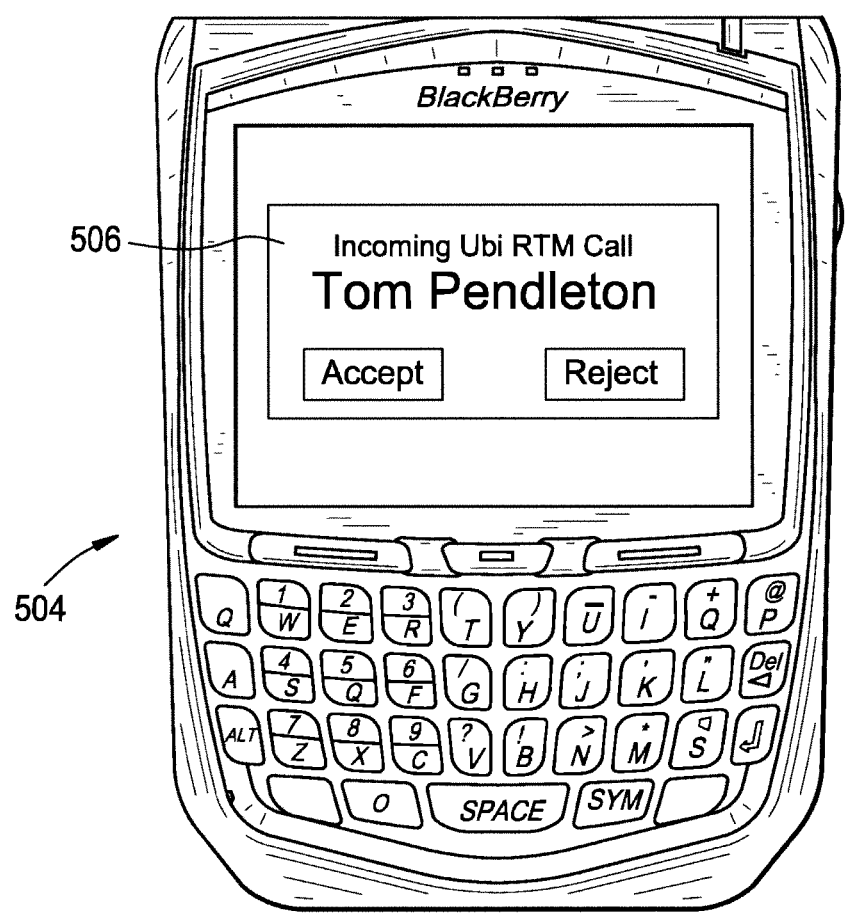
Figure 6:
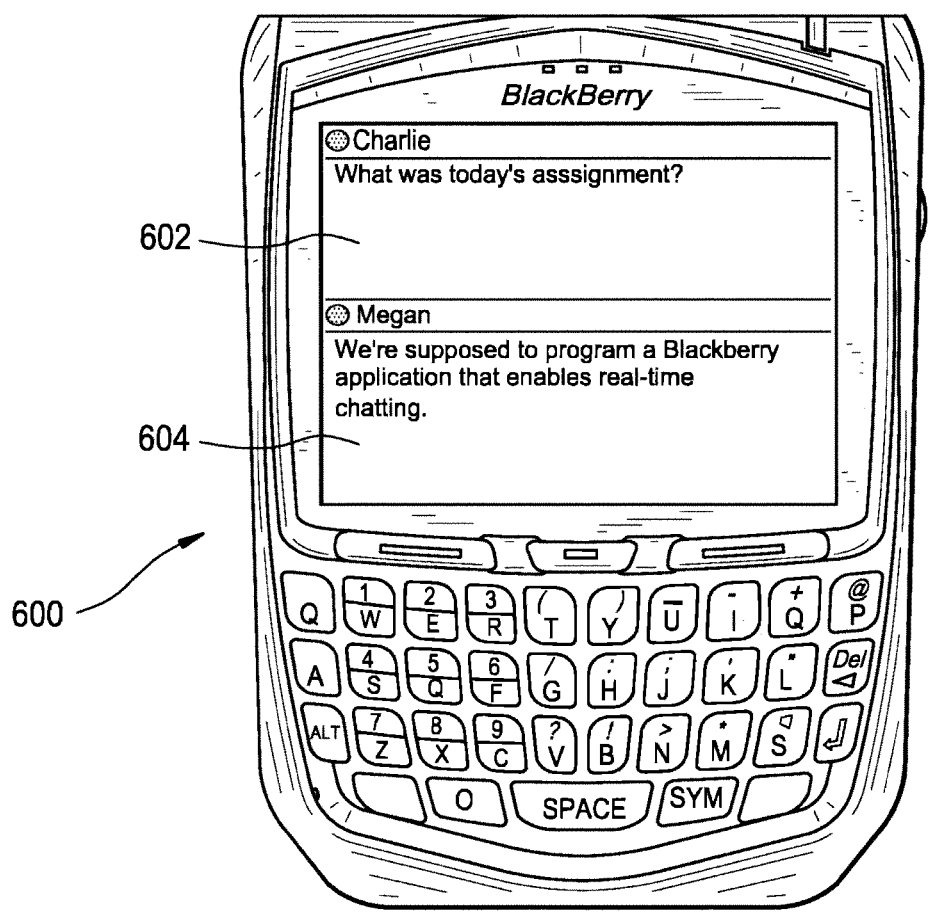
FIG. 6 is an example of the split screen mode that employed during a live real-time text communication between two users according to one embodiment of the present invention.

FIG. 4 is an illustration of a mobile user device 400 including a keypad 404, specifically a BlackBerry™. A list of contacts 402 that are registered with the application server (and are able to communicate with user device 400 via real-time text) is display on display screen 406. FIGS. 5A and 5B depicts a pending conversation request for a real-time text communication between two user devices 500, 504. As seen in FIG. 5A, the communication initiating device 500 waits for the communication invitation to be accepted by the second user device 504. The display of the second user device 504 shows that the first user device 500 has sent a real-time text conversation request, which the user of the second device 504 can either accept or reject 506. FIG. 6 depicts how a real-time text communication may be displayed on a user device 600. In this example, the conversation is between Charlie who is real-time texting on user device 600 (Charlie's key presses populate the top of the split screen 602), and Megan who is real-time texting from a second user device (not shown), and whose key presses are displayed on the lower half of the screen 604. Various other ways of displaying real-time text conversations are contemplated herein.

FIG. 7 illustrates a flowchart for providing real-time communication via text between multiple user devices. In step 702 a conversation request is received at an application server from a first user device, wherein the conversation request is based upon a selection of a second user device form a contact list that is stored on the first user device. Next, in step 704, the conversation request is sent from the application server to a push server. Step 607 receives, at the application server, a conversation session ID from the second user device, if the conversation request is accepted by the second user device. The conversation session ID is sent from the application server to the push server in step 708. Next, in step 710, the application server receives a first datagram message from the first user device, and in step 712, the first datagram message is sent from the application server to the second user device. In step 714, a second datagram message sent from the second user device is received at the application server. The second datagram message is sent from the application server to the first user device in step 716.

Figure 8:
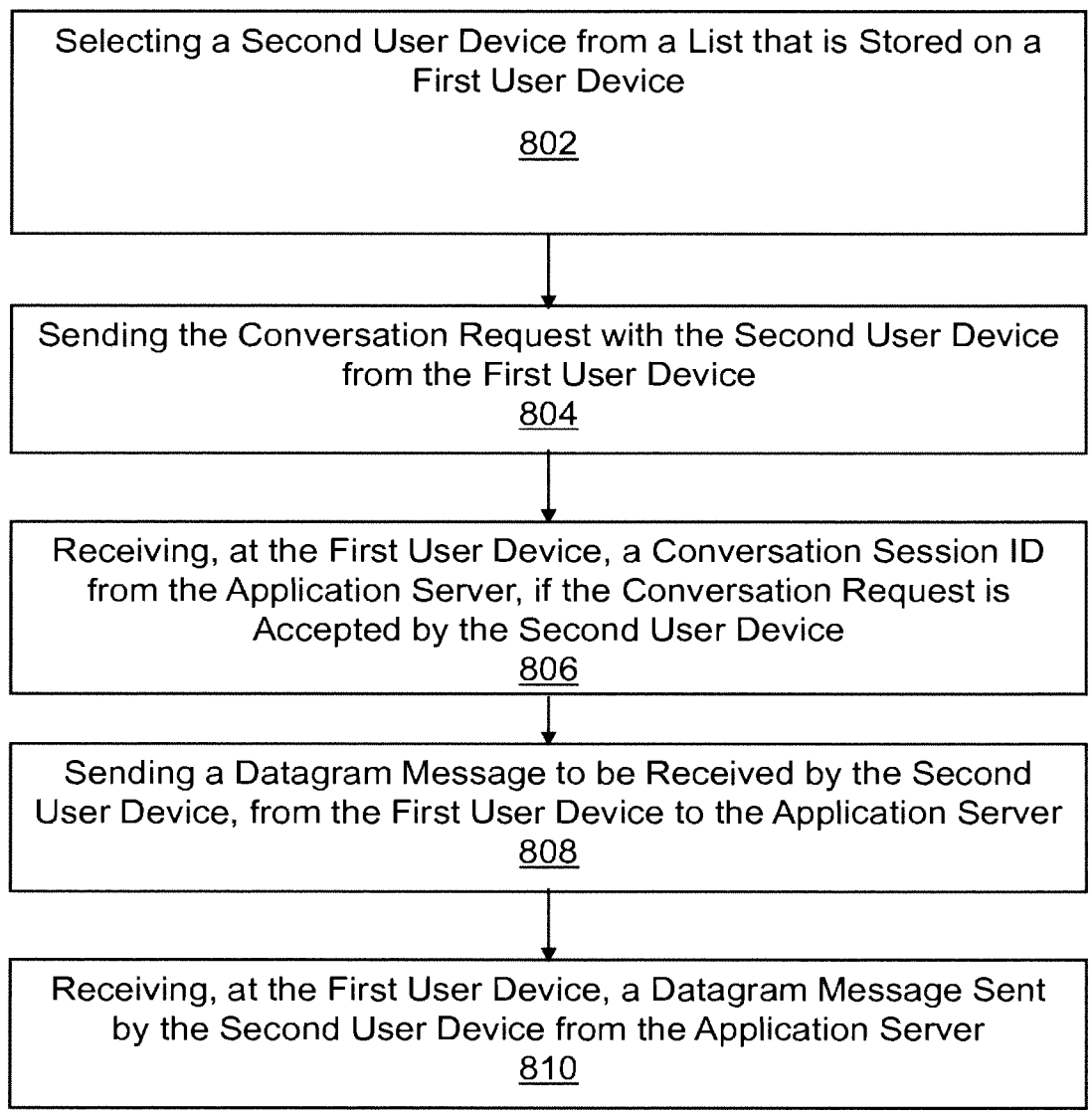
FIG. 8 is a flowchart illustrating another embodiment of a method for a live real-time text communication between users according to the present invention.

FIG. 8 illustrates a flowchart for providing real-time communication via text between multiple user devices in another embodiment of the present invention. A second user device is selected from a list that is stored on a first user device in step 802. Then, a conversation request with the second user device is sent from the first user device in step 804. If the conversation request is accepted by the second user device, then in step 806, the first user device receives a conversation session ID from an application server. In step 808, a datagram message that is to be received by the second user device is sent from the first user device. A datagram message that is sent from the second user device is received at the first user device in step 810.

FIG. 9 depicts a diagrammatic representation of a machine in the exemplary form of a computer system 900 within which a set of instructions, for causing the machine to perform any one or more of the methodologies discussed herein, may be executed. In various embodiments, the machine operates as a standalone computing device or may be connected (e.g., networked) to other machines. If in a network environment, the computing machine may operate in the capacity of a server or a client computing machine in server-client network environment, or as a peer machine in a peer-to-peer (or distributed) network environment. Examples of the computing machine may include a personal computer (PC), a tablet PC, a set-top box (STB), a Personal Digital Assistant (PDA), a cellular telephone, a Blackberry™, a web appliance, a network router, switch or bridge, or any machine capable of executing a set of instructions (sequential or otherwise) that specify actions to be taken by that machine. Further, while only a single machine is illustrated in FIG. 9, the term "machine" shall also be taken to include any collection of machines that individually or jointly execute a set (or multiple sets) of instructions to perform any one or more of the methodologies discussed herein.

The exemplary user device 900 includes a processor 902, e.g., a central processing unit (CPU), a graphics processing unit (GPU) or both, a main memory 904, which may include read only memory (ROM), flash memory, dynamic random access memory (DRAM) such as synchronous DRAM (SDRAM) or Rambus DRAM (RDRAM), etc., and a static memory 906. The static memory can include a flash memory, static random access memory (SRAM), etc., which communicate with each other via a bus 908.

The computer system 900 may further include a video display unit 910, such as a liquid crystal display (LCD), plasma display device, a field emission device, an electroluminescent device or a cathode ray tube (CRT), just to name a few. The computer system 900 also includes an alphanumeric input device 912, such as a keyboard, a cursor control device 914 (e.g., a mouse), a disk drive unit 916, a signal generation device 920, which may include a speaker, a network interface device 922, a digital and/or analog transducer 930, an antenna system 932, a microphone 934, and a battery 936.

The disk drive unit 916 includes a computer-readable medium 924 on which is stored one or more sets of instructions, such as software 926, embodying any one or more of the methodologies or functions described herein. The software 926 may also reside, completely or at least partially, within the main memory 904 and/or within the processor 902 during execution thereof by the computer system 900, the main memory 904 and the processor 902 also constituting computer-readable media. The application that listens for PUSH messages can be stored in the main memory 904 of the device. The software 926 may further be transmitted or received over a network 928 via the network interface device 922.

While the computer-readable medium 924 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Thus, the above described method and apparatus in accordance with the embodiments of the present invention provides a very effective method for recommending relevant products to a user. As can now be fully appreciated, the present invention facilitates recommending products to a user.

The invention can be implemented over any type of communications channel, such as the Internet, a local area network (LAN), a wide area network (WAN), direct computer connections, or the like, using any type of communication hardware and protocols. Any type of hardware or combination of hardware can be used for various clients and servers. Accordingly, the term "computer" as used herein, refers to any type of computing device or data terminal, such as a personal computer, a portable computer, a dumb terminal, a thin client, a hand held device or any combination of such devices. The various clients and servers can be a single computer at a single location or multiple computers at a single or multiple locations. For example, a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used herein refers to any collection of information such as a database file, a lookup table, or the like. While the content items of the embodiment are catalog items. The invention can be applied to any type of content organized in a hierarchy. For example, the invention can be applied to various content items in a content management system such as audio content, video content, or textual content.

The various functions can be implemented by modules which are computer hardware programmed in a desired manner through instructions stored on tangible computer readable media.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method for providing real-time communication via text between multiple user devices, the method comprising:
    receiving, at an application server, a communication request from a first user device, wherein the communication request is based upon a selection of a second user device from a contact list that is stored on the first user device;
    sending the communication request from the application server to the second user device;
    if the communication request is accepted by the second user device, sending a first at least one datagram message to be received by the second user device, from the first user device to the application server, wherein the first at least one datagram message comprises a first at least one transmitted text;
    receiving, at the first user device, a second at least one datagram message sent by the second user device from the application server, wherein the second at least one datagram message comprises a second at least one transmitted text;
    displaying the first at least one transmitted text sent from the first user device on the second user device in a real-time, character-by-character manner as being typed by the first user; and
    displaying the second at least one transmitted text sent from the second user device on the first user device in a real-time, character-by-character manner as being typed by the second user.

2. The method according to claim 1, further comprising simultaneously displaying the at least one second transmitted text in a first section of the second user device while displaying the at least one first transmitted text sent from the first user device in a second section of the second user device.

3. The method according to claim 1, further comprising simultaneously displaying the at least one first transmitted text in a first section of the first user device while displaying the at least one second transmitted text sent from the second user device in a second section of the first user device.

4. The method according to claim 1, further comprising:
    selecting the second user device from a contact list that is stored on the first user device;
    sending a conversation request with the second user device from the first user device to an application server; and
    receiving, at the first user device, a conversation session ID from the application server, if the conversation request is accepted by the second user device.

5. A computer system for providing real-time communication via text between multiple user devices, comprising:
    one or more processors and memory to store one or more programs, the one or more programs comprising instructions for:
    receiving, at an application server, a communication request from a first user device, wherein the communication request is based upon a selection of a second user device from a contact list that is stored on the first user device;
    sending the communication request from the application server to the second user device;
    if the communication request is accepted by the second user device, sending a first at least one datagram message to be received by the second user device, from the first user device to the application server, wherein the first at least one datagram message comprises a first at least one transmitted text;
    receiving, at the first user device, a second at least one datagram message sent by the second user device from the application server, wherein the second at least one datagram message comprises a second at least one transmitted text;
    displaying the first at least one transmitted text sent from the first user device on the second user device in a real-time, character-by-character manner as being typed by the first user; and
    displaying the second at least one transmitted text sent from the second user device on the first user device in a real-time, character-by-character manner as being typed by the second user.

6. The computer system according to claim 5, further comprising simultaneously displaying the at least one second transmitted text in a first section of the second user device while displaying the at least one first transmitted text sent from the first user device in a second section of the second user device.

7. The computer system according to claim 5, further comprising simultaneously displaying the at least one first transmitted text in a first section of the first user device while displaying the at least one second transmitted text sent from the second user device in a second section of the first user device.

8. The computer system according to claim 5, further comprising:
    selecting the second user device from a contact list that is stored on the first user device;
    sending a conversation request with the second user device from the first user device to an application server; and
    receiving, at the first user device, a conversation session ID from the application server, if the conversation request is accepted by the second user device.

9. A non-transitory computer-readable storage medium storing one or more programs for providing real-time communication via text between multiple user devices, the one or more programs for execution by one or more processors of a computer system, the one or more programs comprising instructions for:
- receiving, at an application server, a communication request from a first user device, wherein the communication request is based upon a selection of a second user device from a contact list that is stored on the first user device;
- sending the communication request from the application server to the second user device;
- if the communication request is accepted by the second user device, sending a first at least one datagram message to be received by a second user device, from the first user device to the application server, wherein the first at least one datagram message comprises a first at least one transmitted text;
- receiving, at the first user device, a second at least one datagram message sent by the second user device from the application server, wherein the second at least one datagram message comprises a second at least one transmitted text;
- displaying the first at least one transmitted text sent from the first user device on the second user device in a real-time, character-by-character manner as being typed by the first user; and
- displaying the second at least one transmitted text sent from the second user device on the first user device in a real-time, character-by-character manner as being typed by the second user.

10. The non-transitory computer-readable storage medium according to claim 9, further comprising simultaneously displaying the at least one second transmitted text in a first section of the second user device while displaying the at least one first transmitted text sent from the first user device in a second section of the second user device.

11. The non-transitory computer-readable storage medium according to claim 9, further comprising simultaneously displaying the at least one first transmitted text in a first section of the first user device while displaying the at least one second transmitted text sent from the second user device in a second section of the first user device.

12. The non-transitory computer-readable storage medium according to claim 9, further comprising:
- selecting the second user device from a contact list that is stored on the first user device;
- sending a conversation request with the second user device from the first user device to an application server; and
- receiving, at the first user device, a conversation session ID from the application server, if the conversation request is accepted by the second user device.

* * * * *